United States Patent
Vande Ryse et al.

(10) Patent No.: US 7,464,523 B2
(45) Date of Patent: Dec. 16, 2008

(54) AGRICULTURAL ROUND BALER INCLUDING GUIDE MECHANISM FOR ADJUSTING THE WIDTH OF A WRAPPING MATERIAL

(75) Inventors: Johan A. E. Vande Ryse, Bruges (BE); Jan C. Van Groenigen, Varsenare (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/807,501

(22) Filed: May 29, 2007

(65) Prior Publication Data

US 2007/0277483 A1    Dec. 6, 2007

(30) Foreign Application Priority Data

Jun. 2, 2006    (GB) .................... 0610785.8

(51) Int. Cl.
*B65B 11/04*    (2006.01)
(52) U.S. Cl. ..................... 53/587; 53/201; 53/389.2
(58) Field of Classification Search .......... 53/116, 53/118, 556, 587, 201, 389.2, 389.4
See application file for complete search history.

(56) References Cited

U.S. PATENT DOCUMENTS

| | | | | |
|---|---|---|---|---|
| 2,893,189 | A | * | 7/1959 | Lancaster ............... 53/587 |
| 2,893,191 | A | * | 7/1959 | Lancaster ............. 53/372.9 |
| 4,917,008 | A | | 4/1990 | Wildenberg |
| 4,969,315 | A | * | 11/1990 | Ardueser et al. ........... 53/587 |
| 5,090,182 | A | | 2/1992 | Bethge |
| 5,230,193 | A | | 7/1993 | Underhill et al. |
| 5,243,806 | A | * | 9/1993 | Jennings et al. ........... 53/118 |
| 5,687,548 | A | * | 11/1997 | McClure et al. .......... 53/399 |
| 6,006,504 | A | * | 12/1999 | Myers et al. ............. 53/556 |
| 6,550,218 | B2 | * | 4/2003 | McClure et al. .......... 53/118 |
| 6,796,109 | B2 | * | 9/2004 | Viaud ..................... 53/587 |
| 2002/0189200 | A1 | * | 12/2002 | Anstey et al. ............ 53/118 |

* cited by examiner

*Primary Examiner*—Stephen F Gerrity
(74) *Attorney, Agent, or Firm*—Patrick M. Sheldrake; John William Stader; Michael G. Harms

(57) ABSTRACT

A round baler comprises a mechanism for encircling a bale after it has been formed with a wrapping material drawn from a web on a supply roll. A guide mechanism is provided for adjusting the width of the web of wrapping material as it is offered to a formed bale, so as to selectively enable and disable the wrapping of the edges of the bale.

12 Claims, 3 Drawing Sheets

AGRICULTURAL ROUND BALER INCLUDING GUIDE MECHANISM FOR ADJUSTING THE WIDTH OF A WRAPPING MATERIAL

FIELD OF THE INVENTION

This invention relates to an improvement of an agricultural round baler. More specifically it relates to an improvement to the net wrap dispensing system that allows net wrap to be placed over the edge of a round bale.

BACKGROUND OF THE INVENTION

Agricultural round balers have been used for several decades to collect and bind crop material so as to facilitate the storage of crop material for later use. Generally, a mower or mower-conditioner cuts the crop and arranges it in a windrow for drying. Later, an agricultural tractor pulls a baler over the windrow to collect the crop material. The baler's windrow pickup gathers the cut and windrowed crop and lifts it into the baling chamber. The baling chamber consists of a pair of opposing sidewalls with a series of belts that rotate and compress the crop material into a cylindrically shaped bale. When the bale has achieved a desired size and density, the operator wraps the bale to ensure that the cylindrical and compact nature of the bale is maintained.

There are many wrapping materials and methods of wrapping the bale depending on a variety of factors. Initially, twine was used to wrap the bale. Later net wrap and silage sheets were introduced. Generally, these methods focused on covering the cylindrical portion of the bale and not the ends. After the bale is bound or wrapped, it is ejected from the baler for later pickup by the farmer.

As previously mentioned, there are a variety of agricultural round balers. A general example of this device is illustrated by the New Holland Roll-Belt TM Round Baler model number 678 manufactured by New Holland North America, Inc. Generally, round balers are pulled by an agricultural tractor and receive rotational power from the tractor's power-take-off shaft positioned at the rear of the tractor. The energy is transmitted to a gearbox positioned on the baler. Some balers also use a hydraulic motor and pump arrangement to provide energy to the various baler elements such as the various rollers and belts. As previously discussed, a variety of methods are used to wrap the bale. Relatively recently, the use of netting, herein termed netwrap, has been introduced. It is desirable for bales to maintain a cylindrical shape, however this has been especially difficult near the edge of the cylindrical bale. It is difficult for twine to remain on the edge of the bale as well as mechanically placing the twine in that position. Recently attempts have been made to extend a portion of the netwrap around the edge of the round bale. By allowing a slight portion of the netwrap to extend over the edge of the bale, the appearance of the round bale is improved. Furthermore, the bale is afforded additional protection. These methods have not been entirely successful as the prior art illustrates various deficiencies.

U.S. Pat. Nos. 5,230,193 and 5,243,806 illustrate a conventional fixed/variable hybrid baling chamber. To ensure that the core of the round bale is well defined, a sledge assembly is initially used to compress the crop material. As more crop material is introduced into the baling chamber, the apron of belts is loosened allowing more material to enter the baling chamber. The crop material remains compressed and in a cylindrical shape because of the interaction between the sledge assembly and belt apron. While this approach allows for the creation of a superior shaped and dense round bale, there are greater complications when encircling the bale with the netwrap material. Specially, the netwrap needs to be timed to enter the confines of the baling chamber through the sledge assembly and without interfering with operation of the apron of belts.

U.S. Pat. Nos. 4,366,665; 4,709,125; 4,969,315; 5,090,182; 5,103,621 and 5,311,729 illustrate various designs for wrapping round bales with either netwrap or silage wrap. Typically, the wrap only covers the cylindrical portion of the round bale and not the ends. Usually, the wrap is spread to cover the length of the cylindrical portion of the round bale by a series of idler and spreader rolls. The wrapping material is kept on a roll at a single location for dispensing.

U.S. Pat. Nos. 4,917,008 and 6,006,504 illustrate attempts to extend netwrap over the edge of the cylindrical bale, but on variable sized bale chambers. The baling chambers on these balers are less complex and do not form crop material into cylindrical bales as effectively as a variable/fixed hybrid baling chamber. This is reflected in the simplistic design of the netwrap delivery assemblies. U.S. Pat. No. 6,006,504 uses a pair of guide plates to compress the ends of the bale so as to be able to insert netwrap around the edge of the bale from the rear tailgate. The addition of the guide plates to compress the bale causes additional stresses to the sides of the baling chamber and could also distort the appearance and shape of the bale. U.S. Pat. No. 4,917,008 uses a netwrap that contains an elastic material to wrap around the edge of the cylindrical bale.

EP 1,264,533 discloses an improved netwrap delivery assembly for use on a variable/fixed baling chamber that permits the netwrap to extend around the edge of the cylindrical bale. The baler of the latter patent comprises a so-called duck bill that inserts the wrapping material between the adjacent rolls of the baling chamber. Though some balers are taught in the prior art which provide edge wrapping, and other balers are known which wrap only the cylindrical perimeter of the bales, no baler has hitherto offered the operator the ability to select the manner in which the bales are wrapped. The only way of preventing edge wrapping from taking place in balers of the first type would have been to fit a supply roll of a size not wide enough to the stretched over the edges of the bales.

SUMMARY OF THE INVENTION

The present invention in its broadest aspect, provides a round baler comprising a mechanism for encircling a bale after it has been formed with a wrapping material drawn from a web on a supply roll, characterized by means for adjusting the width of the web of wrapping material as it is offered to a formed bale, so as to selectively enable and disable the wrapping of the edges of the bale.

While it is often desirable for the wrapping material, be it a plastic sheet or netwrap, to cover the edges of the bales, for example to assist in maintaining the shape of the bales during transportation, the present invention recognizes that there are occasions when edge wrapping is deemed undesirable, for example because it interferes with the unwrapping of the bales and it can result in excessive moisture retention when using a silage sheet as the wrapping material. The present invention provides the operator with the option to select the manner in which the bales are wrapped, namely with or without edge wrapping. This is furthermore achieved in a simple manner, which does not require the roll of the wrapping material to be changed.

The web of wrapping material is often spread, for example by using helical spreading rollers, to ensure that it reaches the edges of the bales instead of bunching in the middle. One method of implementing the invention is to modify the position of the spreading rollers so that, when stretched, the web of wrapping material does not reach the edges of the bale.

A second possibility is not to interfere with the spreading rollers but to place a guide somewhere in the path of the web of wrapping material to direct its edges away from the edges of the bale and back on to the cylindrical surface.

The guide may simply compress the wrapping material by crumpling it but another possibility is to fold over the edges of the web of wrapping material by suitable shaping of the guide. The latter embodiment offers the additional advantage of strengthening the wrapping material at the edges of the bale.

The means for adjusting the width of the wrapping material as it is offered to a formed bale may involve the mounting or interchanging of guide surfaces lying in the path of the web of wrapping material. This operation may be carried out manually by physically dismounting and repositioning the guide surfaces. Alternatively, the guides may be designed to be movable between different positions, in which their repositioning can the carried remotely, such as by the use of a cable or a mechanical linkage. A further possibility is for the guides to be movable by an electric, hydraulic or pneumatic motor.

In the case of a baler of the type described in EP 1,264,533, i.e. one having a duck bill, the guide may be mounted on the duck bill. However, the invention is not restricted to balers using duck bills and, for example, in the baler described in U.S. 2002/0189200, the guide shown in FIG. 7 of the publication for turning up the edges of the web of wrapping material may be modified to fold over the edge of the web into a flap that is tucked beneath the outer layer of the web when it wrapped around a bale.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

The invention is described below by reference to a baler using a duck bill to introduce the web of wrapping material into the baling chamber but it should be emphasized that the invention may be used in other forms of balers.

The drawings and following description concentrate on a wrapping mechanism for use in a baler. The remainder of the baler will not be described or illustrated in detail but it is mentioned for completeness that the baler may be as described in U.S. Pat. No. 4,956,968, which is incorporated herein by reference.

Figure 1:
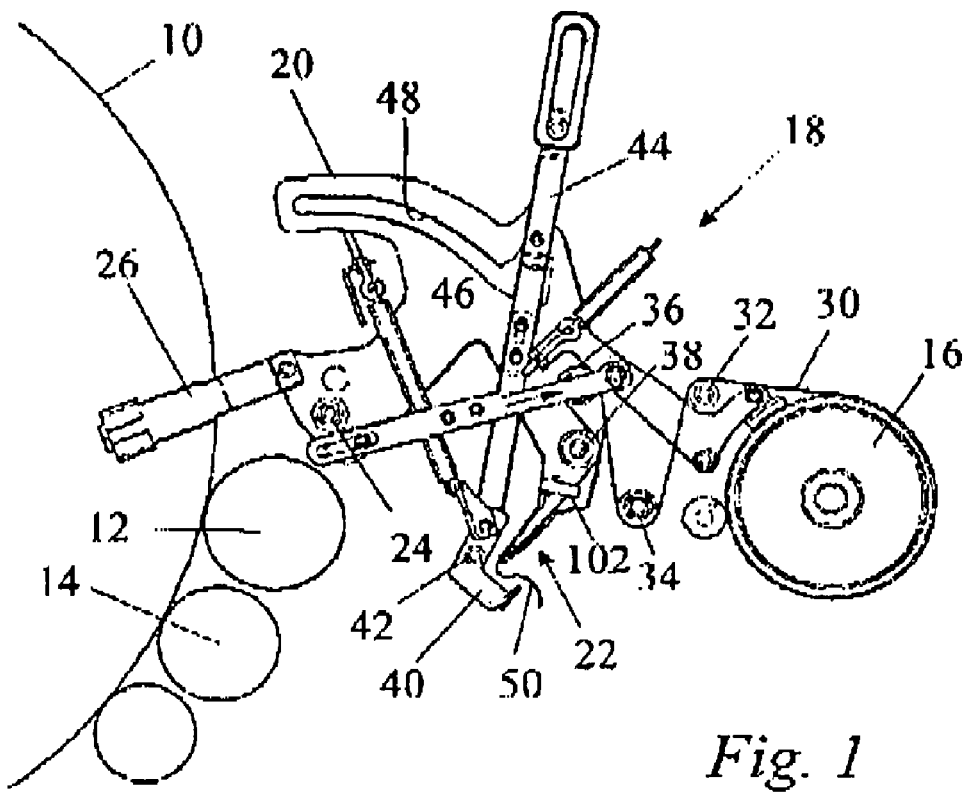
FIG. 1 is diagram showing a wrapping mechanism of a baler at the end of a wrapping cycle with the duck bill in its retracted position.

In accompanying FIG. 1, a bale being formed in the bale forming chamber of a round baler is designated 10. The bale 10 is caused to rotate within the chamber by various transverse rollers and/or belts of which only the two rollers designated 12 and 14 are relevant to the present invention. To wrap the bale 10, a wrapping material 30 drawn from a supply roll 16 is introduced by a feed mechanism generally designated 18 through the gap between the two rollers 12 and 14 into the bale forming chamber.

The feed mechanism comprises two end plates 20 arranged on opposite sides of the baler and a duck bill generally designated 22 which extends across the width of the baler between the two end plates 20. In the duck bill 22, which is described in further detail below, the wrapping material is gripped between a plate that is fixed to the two end plates 20 and a pivoted plate that is spring biased towards the fixed plate. The wrapping material 30 passes between the fixed plate and the pivoted plate and is gripped by them. The wrapping material can pass freely through the duck bill 22 when moving towards the bale forming chamber but not in the opposite direction.

Figure 2:
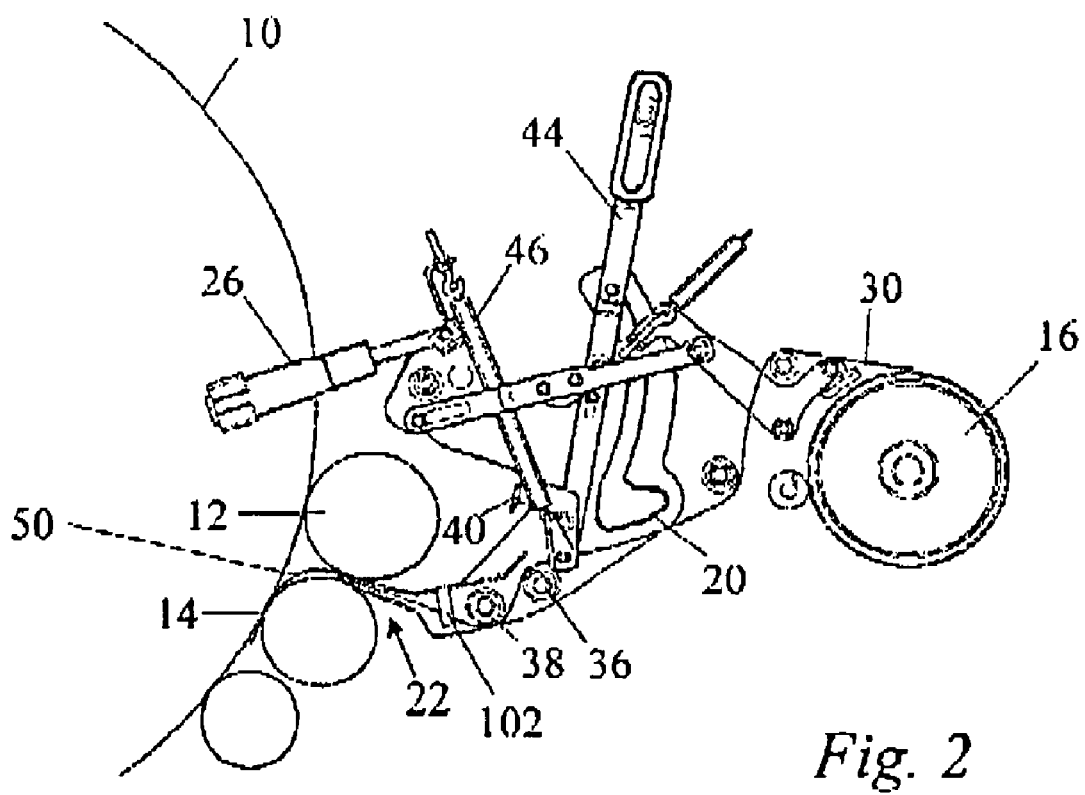
FIG. 2 shows the mechanism of FIG. 1 when the duck bill is in its advanced position.

The two end plates 20 are pivoted about an axis 24 and are caused to pivot by means of hydraulic actuators 26 to move the duck bill 22 between the two end positions shown in FIGS. 1 and 2. The wrapping material 30 is guided over fixed guide rollers 32 and 34 and two guide rollers 36 and 38 that are mounted for movement with the duck bill 22 and the end plates 20. As is known, each of the guide rollers 36 and 38 may be formed near its two axial ends with oppositely handed helical formations which act as spreaders to keep the wrapping material taut across the width of the duck bill 22.

FIGS. 1 and 2 also show a cutting mechanism for severing the wrapping material 30 after a bale has been formed. The cutting mechanism comprises a knife 40 pivoted about an axis 42 and operated by means of a push-rod 44. The knife is resiliently biased into the position shown in FIG. 1 by means of a compression spring 46 and the push-rod 44 is guided for linear movement and is displaced by means of a cam slot 48 in the end plates 20.

At the commencement of a wrapping cycle, the duck bill 22 is in the position shown in FIG. 1 in which the knife 40 has just been operated to sever the wrapping material a short distance in front of the duck bill 22 to leave a loose flat of wrapping material 50 protruding from the duck bill 22.

To commence a new wrapping cycle after the next bale has been formed, the hydraulic actuators 26 are operated to rotate the end plates 20 into the position shown in FIG. 2. This advances the duck bill 22 into the gap between the transverse rollers 12 and 14 and the flap 50 of wrapping material is introduced into the bale forming chamber. During correct operation, the flap 50 should then be gripped by the bale 10 and carried round the periphery of the bale forming chamber. At some stage after it has been sensed that the wrapping material is being drawn from the supply roll 16, the duck bill is returned by the end plates 20 to the position shown in FIG. 1. At the end of the wrapping cycle, the cam slot 48 displaces the push-rod 44 to operate the knife 40 once the requisite length of the wrapping material has been dispensed. The cutting operation leaves the loose flat 50 protruding from the duck bill 22, while on the other side the wrapping material is drawn into the bale forming chamber.

The above brief description is believed to suffice for an understanding of the present invention but it should be added that, as so far described, the baler and the wrapping mechanism operate in a manner generally analogous to that well documented in the prior art and further reference may be made to earlier publications for a more detailed description.

Figure 3:
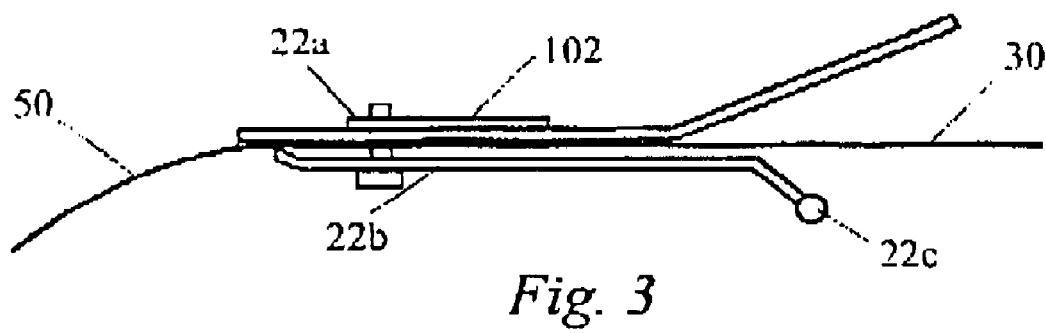
FIG. 3 is a section through a conventional duck bill.

The duck bill 22 known from the prior art is shown in section in FIG. 3. In this drawing, the upper plate 22a is the one fixed to the end plates 20 and the lower plate 22b is pivoted about the axis 22c and urged upwards so that the wrapping material 30 is gripped between the two plates.

Figure 4:
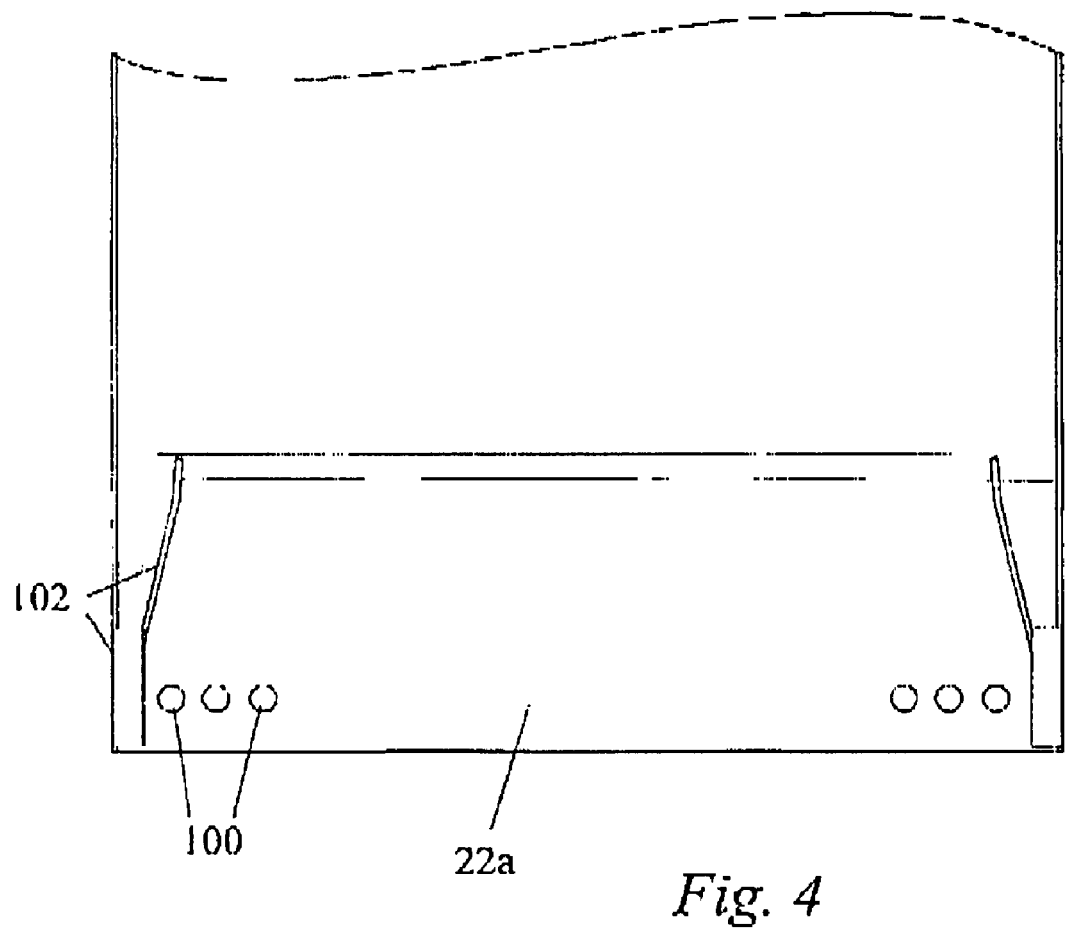
FIG. 4 is a plan view of one of two plates of the duck bill which has been modified to allow the width of the web to be adjusted.

FIG. 4 shows the web facing surface of one of the plates 22a of the duck bill. At its opposite ends, the plate 22a has guides 102 which confine the outer edges of the web as it is offered to the bale in the baling chamber. In the illustrated position of the guides 102, the web is at its widest and overlaps the edges of the bale to cause the edges to be wrapped. The guides 102 can, in their most simple form, be two pins secured from the bottom of the plate 22a instead of the guide 102 as shown in FIG. 4.

The illustrated plate 22a is additionally provided with holes 100 which allow the guides 102 to be repositioned, or additional guides mounted, to restrict the width of the web so that it does not wrap around the edges of the bale.

Figure 5:
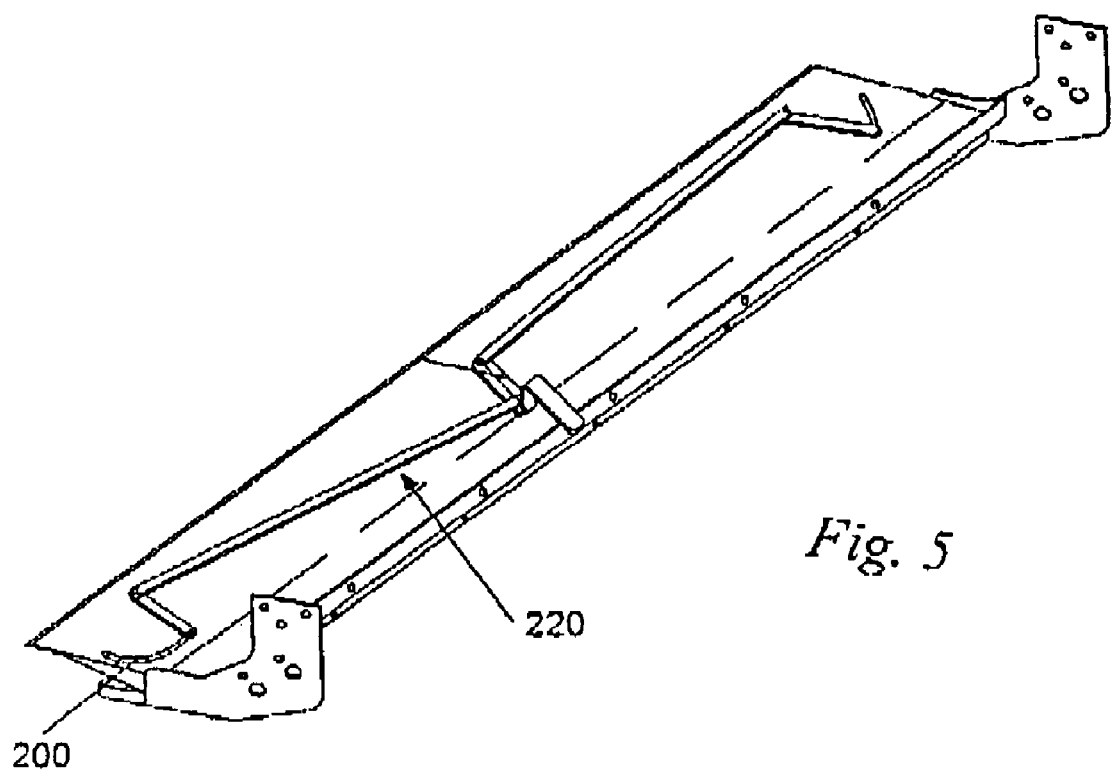
FIG. 5 is a bottom view of the duck bill showing the means for repositioning the guides.

The illustrated embodiment requires the repositioning of the guides 102 be performed manually, but it will be appreciated that instead of providing holes 100, the guides 102 could be slidably mounted in a slit 200 (FIG. 5) allowing them to be repositioned by repositioning means (220) such as a rod, a cable or by means of a suitable motor.

Figure 6:
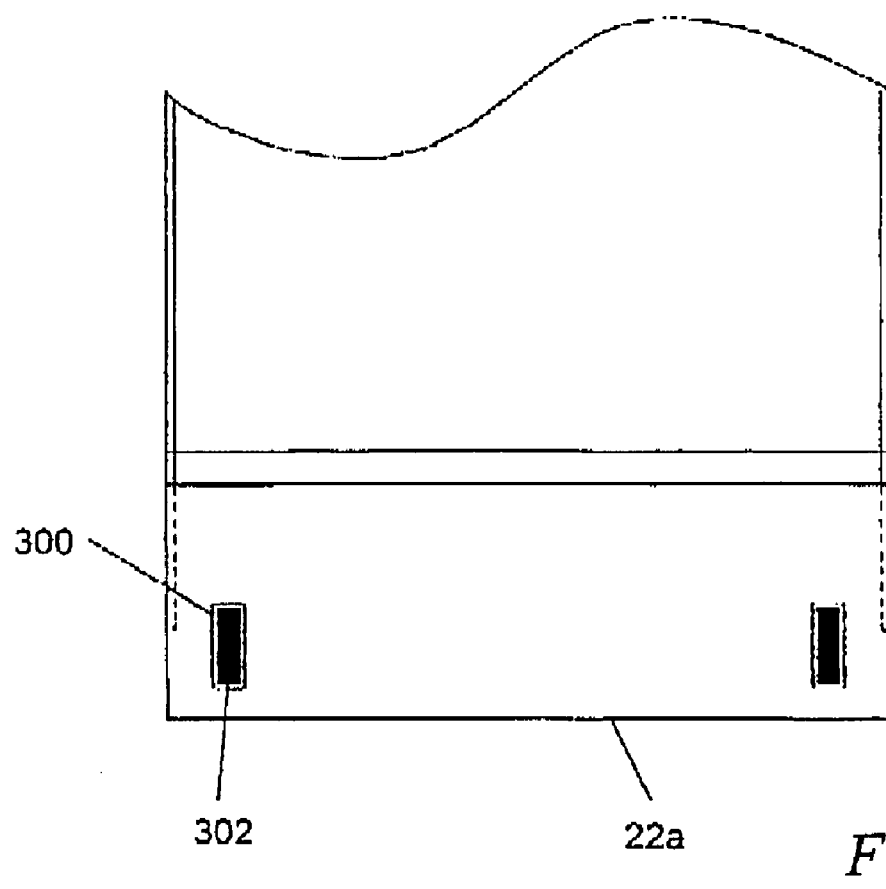
FIG. 6 shows an alternative embodiment of the guiding means.

A further embodiment is shown in FIG. 6 which shows the use of a pivotable plate 302, which can be brought into an active position by a pivoting mechanism. When the plate 302 is stored into the groove 300, it forms part of the surface of the plate 22a, while when it is lifted by the pivoting mechanism, it will guide the web of material away from the edges of the bale.

In balers that do not use duck bills, the invention can be implemented in an analogous manner either by constraining the edges of the web as it is advanced towards the bale or by folding over the edges of the web to prevent them from wrapping around the edges of the bale.

Instead of constraining the edges of the web after it has been stretched by the helical spreading formations described above, a further possibility is to reposition the helical formations in order the prevent the web from being extended laterally in the first place.

The invention claimed is:

1. A round baler comprising:
a mechanism for encircling a bale after it has been formed with a wrapping material drawn from a web on a supply roll, a guide mechanism for adjusting the width of the web of wrapping material as it is offered to a formed bale, the guide mechanism having at least a first enabled position for guiding the wrapping material away from the edges of the bale and a second disabled position for permitting wrapping of the edges of the bale, wherein the guide mechanism does not contact the formed bale.

2. The round baler as claimed in claim 1, wherein helical spreading rollers are provided to spread the web laterally and means are provided to modify the position of the spreading rollers so that, when stretched, the web of wrapping material does not reach the edges of the bale.

3. The round baler as claimed in claim 1, further comprising a guide positioned in the path of the web of wrapping material, to direct the edges of the web away from the edges of the bale and back on to the cylindrical surface.

4. The round baler as claimed in claim 3, wherein the guide acts to compress the wrapping material by crumpling it.

5. The round baler as claimed in claim 3, wherein the guide acts to fold over the edges of the web of wrapping material.

6. The round baler as claimed in claim 1, wherein adjustment of the width of the wrapping material as it is offered to a formed bale is performed by mounting, interchanging or repositioning of guide surfaces lying in the path of the web of wrapping material.

7. The round baler as claimed in claim 6. wherein the mounting of guide surfaces is carried out manually.

8. The round baler as claimed in claim 6, wherein repositioning of guide surfaces is carried out remotely by the use of a cable or a mechanical linkage.

9. The round baler as claimed in claim 6, wherein repositioning of guide surfaces is carried out remotely by an electric, hydraulic of pneumatic motor.

10. The round baler as claimed in claim 1, further comprising:
a baling chamber having adjacent rolls; a duck bill having first and second grasping plates for introducing the web of wrapping material into the baling chamber between adjacent rolls of the baling chamber; and
the guide mechanism having at least one guide member mounted the to the surface of at least one plate of the duck bill for adjusting the width of the web as it is offered to the surface of a bale in the baling chamber.

11. The round baler as claimed in claim 10, wherein the guide mechanism for adjusting the width of the web of wrapping material as it is offered to a formed bale comprises an element slidably stored within a groove of at least one grasping plate. the element is connected to pivoting mechanism for selectively moving the plate from a storage position generally flush with the surface of a plate to an activated position for guiding the material.

12. The round baler of claim 10, wherein the guide mechanism is a retractable pin inserted through the surface of the grasping plate.

* * * * *